United States Patent Office 3,325,463
Patented June 13, 1967

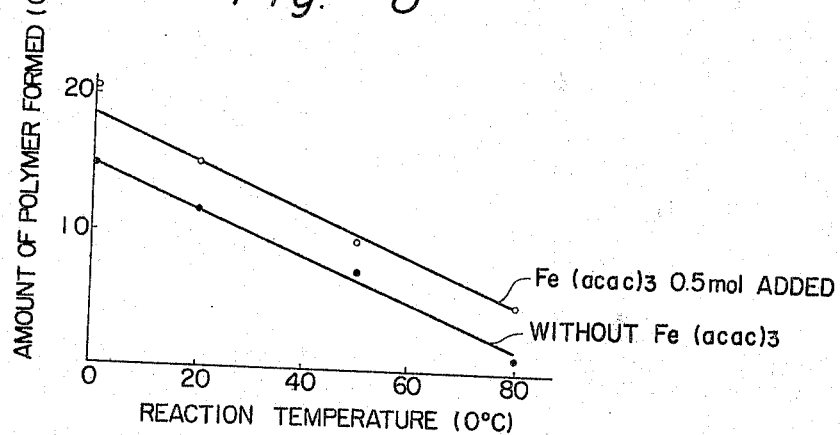
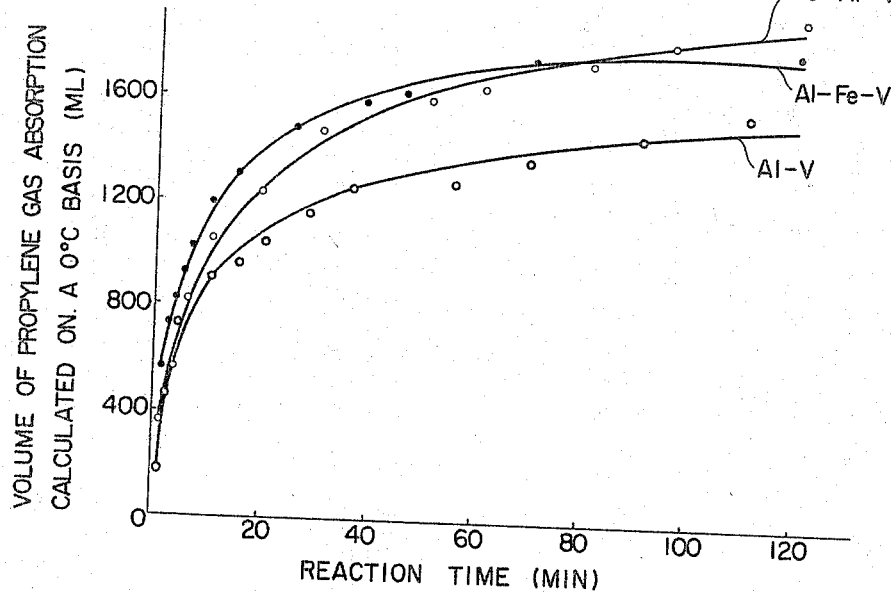

3,325,463
PREPARATION OF POLYOLEFINS WITH CATALYST COMPRISING VANADIUM TETRACHLORIDE, IRON ACETYL ACETONATE AND AN ORGANOMETALLIC COMPOUND
Masao Iwamoto and Sadao Yuguchi, Ohtsu-shi, Shiga-ken, Japan, assignors to Toyo Rayon Kabushiki Kaisha, Tokyo, Japan, a corporation of Japan
Filed Feb. 12, 1964, Ser. No. 344,275
Claims priority, application Japan, Mar. 22, 1963, 38/13,408; Apr. 8, 1963, 38/17,389; July 10, 1963, 38/35,349; Aug. 8, 1963, 38/40,701
6 Claims. (Cl. 260—93.7)

This invention relates to a process for preparing polyolefins. More particularly, the invention relates to a process for preparing polyolefins from the alpha-olefins, such as the preparation of polypropylene, polyethylene or the ethylene-propylene copolymer from propylene.

Many catalyst systems, including the Ziegler type catalyst, are known as polymerization catalysts for alpha-olefins such as ethylene and propylene. For example, the Ziegler type catalyst consists of a combination of an organometallic compound of a metal of Groups I–III of the periodic table and a halide of a transition metal of Groups IV–VI. This type of catalyst is recognised as being the most highly active catalyst for polymerising numerous polymerisable or copolymerisable monomers to high molecular weight polymers. As is well-known, however, the organometallic compounds of the metals of Group I–III are highly reactive, being sensitive to oxygen and moisture, and therefore require special equipment and utmost care in handling in air. Further, it frequently happens that the transition metal halides such as titanium tetrachloride, titanium trichloride and vanadium tetrachloride, which are used as catalysts in the polymerisation of ethylene and of propylene and the copolymerisation of ethylene with propylene, in all instances, lose their desirable properties by being affected by the oxygen and moisture in the air or deteriorate by being subjected to the action of heat and light during storage.

The catalyst system comprising a combination of an organic aluminum compound such as triethyl aluminum and diethyl aluminum halide and a titanium halide such as titanium trichloride and titanium tetrachloride is known to be particularly useful for polymerising propylene, but in addition to the disadvantage of its sensitivity to oxygen and moisture, it also has a limited utility. This catalyst can only produce polypropylene having the repeating unit

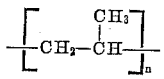

by means of the addition bonding of propylene at the 1,2-positions, and it cannot make polyethylene from propylene by addition at the 1,3-positions or an ethylene-propylene copolymer by addition at both the 1,2- and 1,3-positions.

We have found that a composition comprising an addition product of vanadium tetrachloride and iron acetyl acetonate, and an organo-metallic compound of a metal of Groups I–III is an effective catalyst for the polymerisation of polypropylene and has a reduced sensitivity to oxygen and moisture. Preferred compositions are obtained by adding an organo-metallic compound of Groups I–III of the periodic table, for example, trialkyl aluminum, to a mixture of vanadium tetrachloride and iron acetyl acetonate (Composition A) and by adding vanadium tetrachloride to a mixture of iron acetyl acetonate and trialkyl aluminum (Composition B). The organometallic compound of a metal of Groups I–III of the periodic table is widely known as one of the components of the Ziegler type catalyst, and is a compound represented by the general formula $MR_{n-m}X_m$ wherein M is the metal of Groups I–III of the periodic table, R is a hydrocarbon group, X is hydrogen or a halogen atom, $n$ is the valency of the metal M, $m$ is either 0 or a positive integer and $n$ is greater than $m$. Preferred organometallic compounds are triethyl aluminum, tri(isobutyl) aluminum, diethyl aluminum chloride, di(n-butyl) aluminum chloride, butyl sodium, butyl lithium, ethyl lithium, diethyl zinc and dibutyl cadmium.

When, in preparing Composition A, vanadium tetrachloride (preferably in the form of solution in a solvent such as pentane) and iron acetyl acetonate are mixed in equimolar quantities, an addition compound of the two is formed quantitatively. Thus addition compound is a dark green stable crystalline solid which can withstand extended periods of storage. When vanadium tetrachloride and iron acetyl acetonate are mixed in a proportion in which one is in excess, then a mixture consisting of the foregoing addition compound and the compound in excess is obtained. This mixture, however, is also stable and can withstand extended periods of storage without deterioration. The iron acetyl acetonate is suitably mixed with the vanadium tetrachloride in a mole ratio $$([Fe]/[V]) = 0.01-2.0$$

the ratio 0.25 to 1.5 being particularly preferred.

Further, according to the present invention, we provide a proces for preparing a polyolefin.

The catalyst composition may be used in any of the following ways; the organometallic compound may be mixed with a previously prepared vanadium tetrachloride-iron acetyl acetonate addition product, which is then added to the polymerisation system; the previously prepared vanadium tetrachloride-iron acetyl acetonate addition product may be first added to the polymerisation system, followed by the addition of the organometallic compound; or the vanadium tetrachloride and the iron acetyl acetonate may be first added to the polymerisation system with no special order and the organometallic compound added subsequently. The amount of organometallic compound added is in a proportion such that the mole ratio of the metal (e.g. Al) to the vanadium (Al/V) is greater than 1.

Suitable solvents include the hydrocarbons and halogenated hydrocarbons or the various mixtures thereof, for example, saturated aliphatic hydrocarbons such as pentane, hexane, heptane and octane; chlorinated aliphatic hydrocarbons such as methylene chloride and ethylene dichloride; alicyclic hydrocarbons such as cyclohexane, methyl cyclohexane and decahydronaphthalene; aromatic hydrocarbons such as benzene, toluene, xylene and tetrahydronaphthalene; chlorinated aromatic hydrocarbons such as chlorobenzene, o-dichlorobenzene and alpha-chloronaphthalene and mixtures of the above compounds such as kerosene, petroleum benzine, ligroin, petroleum ether, etc. The preferred reaction temperature is 0–200° C., particularly 20–150° C. and the preferred reaction pressure is from atmospheric to 50 kg. per square centimeter.

The process of this invention can be applied to straight chain alpha-olefins such as ethylene, propylene, butene-1, pentene-1, and decene-1, and to branched alpha-olefins such as 3-methyl butene-1 and 4-methyl pentene-1. In addition, the process may be employed to produce homopolymers or copolymers, such as propylene/ethylene and ethylene/butene-1.

We have found that for polymerising propylene the use of Composition B was especially effective. In this case, the preferred procedure for adding the catalyst is to add first to the polymerisation system the iron acetyl acetonate and the trialkyl aluminum in any order and then add the vanadium tetrachloride. The proportion in which these three components are used may be about the same as in the case of Composition A described previously. It is assumed in this case also that a [Fe]—[Al] addition compound is formed as in the case of Composition A. The other reaction conditions, i.e., the reaction temperature, pressure and the type of solvent may be substantially the same as previously described. The product obtained is a polypropylene having the repeating unit comprising

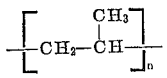

resulting from addition at the 1,2-positions.

Surprisingly, when the reaction was carried out, under suitably selected reaction conditions using Composition A as the catalyst, and particularly when triethyl aluminum was used, a hydrogen shift polymerisation of propylene, i.e., the polymerisation resulting from the addition of propylene at the 1,3-positions, would take place.

In polymerising propylene, it is usual that polypropylene is formed by the addition at the 1,2-positions. While the formation of a polymer by the addition of propylene at the 1,3-positions was conceivable theoretically, there has been no evidence of its production. It is conceivable theoretically that when a complete hydrogen shift polymerisation of the propylene takes place, polyethylene having repeating unit $\text{-[CH}_2\text{—CH}_2\text{—CH}_2\text{]-}_n$ would be formed, but that in case of a partial hydrogen shift polymerisation the formation of an ethylene-propylene copolymer would result. As a result of this invention, employing Composition A, as above, and by selecting the reaction conditions it becomes possible to actually produce a low to medium density polyethylene and a polymer similar to ethylene-propylene copolymer.

The critical reaction conditions are pressure, temperature and the type of solvent. Solvents especially preferred are the aromatic and aliphatic hydrocarbons and the halogen derivatives thereof. The pressure suitably is 0–8 kg./cm.$^2$ g.

For example, when propylene is polymerised at atmospheric pressure using benzene as the solvent, true crystalline polyethylene (only a few methyl groups are contained per 100 carbon atoms) is formed. On the other hand, when propylene is polymerised at a pressure of 0–8 kg./cm.$^2$ g. using benzene as the solvent, a polymer having a structure in which ethylene and propylene are copolymerised in any desired proportion can be formed depending on the reaction pressure. When, however, an aliphatic halogenated hydrocarbon such as ethylene dichloride is used as the solvent, at atmospheric pressure true polyethylene results, but at superatmospheric pressures or at low temperatures an ethylene-propylene copolymer is formed with comparatively fewer additions at the 1,3-positions but comparatively greater additions at the 1,2-positions.

Generally speaking, it is believed that as the concentration of the propylene dissolved in the reaction system is increased, addition at the 1,2-positions increases, and as the concentration of the propylene is reduced, addition at the 1,3-positions increases. Hence, by suitably selecting the pressure, the temperature and the type of solvent and adjusting the propylene concentration in the reaction system the amount of the addition at the 1,3-positions can be suitably controlled.

While the details of the reaction mechanism of the hydrogen shift polymerisation are as yet not clear, it is assumed to be as follows: Since the methyl group of propylene is an electron donating group, the electron flows to the vinyl group as follows:

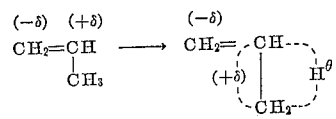

and as a result of shifting the hydrogen atom of the methyl group to adjacent carbon atom, the propylene participates in the polymerisation reaction in a form such as:

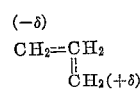

The polymer obtained by the process of this invention is polyethylene or ethylene-propylene copolymer which was clarified from the measurement of physical properties such as infrared absorption spectrum, X-ray diffraction, melting point and specific gravity. And this shows clearly the occurrence of hydrogen shift polymerisation.

The accompanying drawings are graphs illustrating the physical properties of the polymer formed according to this invention.

FIGS. 8 and 9 are graphs illustrating the effects obtained in the polymerisation using Composition B as catalyst. Explanations of these graphs will be given in the examples presented below.

Figure 1:
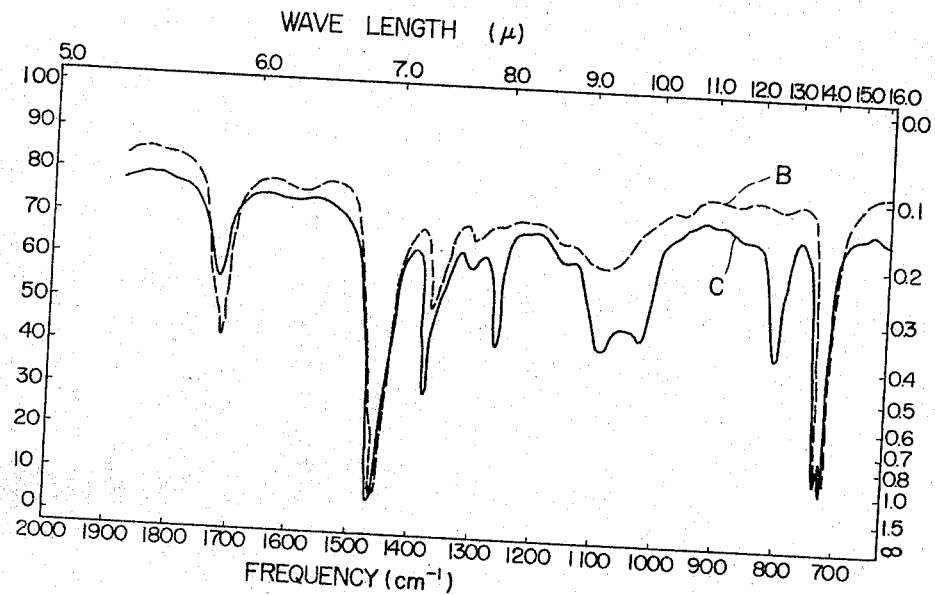
FIG. 1 and FIGS. 3–7 are graphs showing the infrared absorption spectra of the polymer formed by the hydrogen shift polymerisation in this invention and of polymers formed by conventional processes.

The invention is hereinafter particularly described, by way of illustration only, in the following examples.

*Example 1*

An n-pentane solution of vanadium tetrachloride was added to iron acetyl acetonate prepared from ferric chloride and acetyl acetone; a vanadium tetrachloride-iron acetyl acetonate addition compound (hereinafter abbreviated to [V]·[Fe] was formed as blackish green crystals. This was washed with n-heptane and petroleum ether and then dried in vacuum.

0.45 g. of this [V]·[Fe] and 1 ml. of triethyl aluminum were charged to a pressure reactor with 50 ml. of n-heptane.

A charge of ethylene at a pressure of 30 kg./cm.$^2$ g. was introduced and the reactor was allowed to stand at 20° C. Absorption of ethylene occurred rapidly so that after 30 minutes the pressure gauge became about 0. About 2 g. of polyethylene was obtained.

*Example 2*

0.2 g. of [V]·[Fe] and 1 ml. of diethyl aluminum chloride were charged with 50 ml. of n-heptane to a 100-ml. autoclave equipped with a stirrer. Then, at room temperature, the autoclave was pressured to 8 kg./cm.$^2$ g. with propylene and then ethylene was additionally introduced up to 13 kg./cm.$^2$ g. pressure. By carrying out the reaction at 50° C., 6.3 g. of a soft rubberlike solid was formed. The ether extract of this product was an ethylene-propylene copolymer whose molar percentage of propylene was 42.7%. Further, the n-heptane extract of the ether extraction residue was a copolymer containing 39 mole percent of propylene.

The [V]·[Fe] addition product used in this example was preserved for 3 months after preparation by the method described in Example 1 in a reagent bottle equipped with a ground stopper. Although a long period of time had elapsed since its preparation, neither a change in the colour nor a decline in its activity was observed. Vanadium tetrachloride alone usually decomposes almost completely and solidifies in storage.

Example 3

An autoclave was charged with the same catalyst and solvent as in Example 2 and propylene gas introduced at cylinder pressure; stirring was carried out for 10 hours at 30° C.

About 1 g. of a viscous solid was obtained, 95% of which was soluble in n-heptane. The n-heptane insoluble portion had a melting point of 107–112° C.

Example 4

Propylene was polymerised as in Example 3, except that ethylene dichloride was used as the solvent. About 0.4 g. of polypropylene having a melting point of 95–106° C. was obtained.

Example 5

The same procedures as described in Example 3 were followed, except that triethyl aluminum was used instead of diethyl aluminum chloride. A solid polymer having a melting point of 131–142° C. was formed in an amount of 0.7 g.

Example 6

To a 500-ml. 4-neck flask equipped with a stirrer, reflux condenser, gas inlet tube and thermometer were charged 1 g. of [V]·[Fe] and 1 ml. of triethyl aluminum with 300 ml. of benzene. Ethylene gas under atmospheric pressure was then introduced into the flask at the rate of 100 ml./min., and the polymerisation carried out for 40 minutes at 50° C. When the reaction mixture was treated with usual procedures 2.5 g. of polyethylene was obtained.

Example 7

0.5 g. of [V]·[Fe] and 1 g. of diethyl magnesium along with 50 ml. of benzene were charged to a 100-ml. autoclave equipped with a magnetic stirrer, and, while gradually raising the temperature from 20° C. to 80° C., ethylene was polymerised under a pressure of 30 kg./cm.² g. Polyethylene having a melting point of 120–131° C. was obtained in an amount of 0.2 g.

Example 8

After charging 0.5 g. of [V]·[Fe] and 4.5 g. of a paraffin dispersion of butyl lithium (15% butyl lithium content) with 50 ml. of benzene to the same autoclave as in Example 7, ethylene was introduced under pressure to 30 kg./cm.² g. at room temperature, and the temperature was gradually raised to 50° C. 2.78 g. of polyethylene was formed.

Example 9

0.5 g. of [V]·[Fe] and 1 ml. of triethyl aluminum were charged with 50 ml. of benzene to the autoclave of Example 7. Then, cooling the autoclave with ice, butene-1 was introduced from a cylinder bomb, and after raising the temperature to 50° C., the reaction was allowed to proceed for 2 hours. 0.15 g. of white solid polybutene-1 was obtained.

Example 10

One g. of [V]·[Fe] and 2 ml. of triethyl aluminum were charged with 300 ml. of benzene to the 4-neck flask equipped as in Example 6, and at 50° C. propylene gas was continuously introduced for 2 hours at the rate of 200 ml./min. The reaction mixture was treated with methanol, and the precipitated white solid substance was dried in vacuum. The product was obtained in an amount of about 1.2 g. and its melting point was 135–140° C., specific gravity (measured by the buoyancy method; to apply likewise hereinafter) was 0.9242 and the intrinsic viscosity $$[\eta]_{tetralin}^{135°C.}$$

was 3.6 About 27.5% of this white solid substance dissolved in n-heptane. The specific gravity of the n-heptane soluble portion was 0.9095 and the specific gravity of the portion remaining after extraction with n-heptane was 0.9346.

Curve A in FIG. 1 is the infrared absorption spectrum of the portion extracted with n-heptane, while curve B is that of the residue. In both cases strong absorptions are observed at wave number 720–735 cm.$^{-1}$. These absorption bands are known to be present in polyethylene but not polypropylene. It is seen that the absorption of Curve B at the wave number of 1156 cm.$^{-1}$ which corresponds to the content of methyl groups is weak and is close to that of polyethylene.

Figure 2:
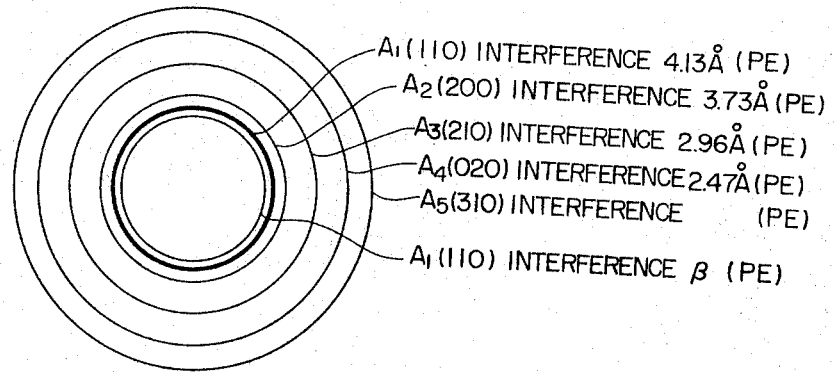
FIG. 2 is an X-ray diffractions pattern of the polymer of FIG. 1.

The foregoing crude product was submitted to an X-ray crystallographic refraction test and from the X-ray diagram the spacing of Debye-Scherrer ring was measured. The results obtained are tabulated below. FIG. 2 shows the X-ray diffraction patterns.

| Debye-Scherrer ring | Observed Value (A.) | Theoretical Value (A.)* |
|---|---|---|
| $A_1$ | 4.13 | 4.10 |
| $A_2$ | 3.73 | 3.70 |
| $A_3$ | 2.96 | 2.96 |
| $A_4$ | 2.47 | 2.47 |

*C. W. Brown, Trans. Faraday Soc. 35, 482 (1939).

Thus, from the results of the various foregoing tests, the polymer obtained in this example can be considered as being a substance that is quite close to polyethylene.

Example 11

A 100-ml. magnetic stirrer-equipped autoclave was charged with 1 g. of [V]·[Fe] and 2 ml. of triethyl aluminum along with 50 ml. of benzene. To this was then introduced propylene gas at cylinder pressure after which the temperature was raised to 50° C. and the reaction was carried out for 2 hours. 0.35 g. of a light brown polymer having rubber-like elasticity was obtained.

Figure 3:
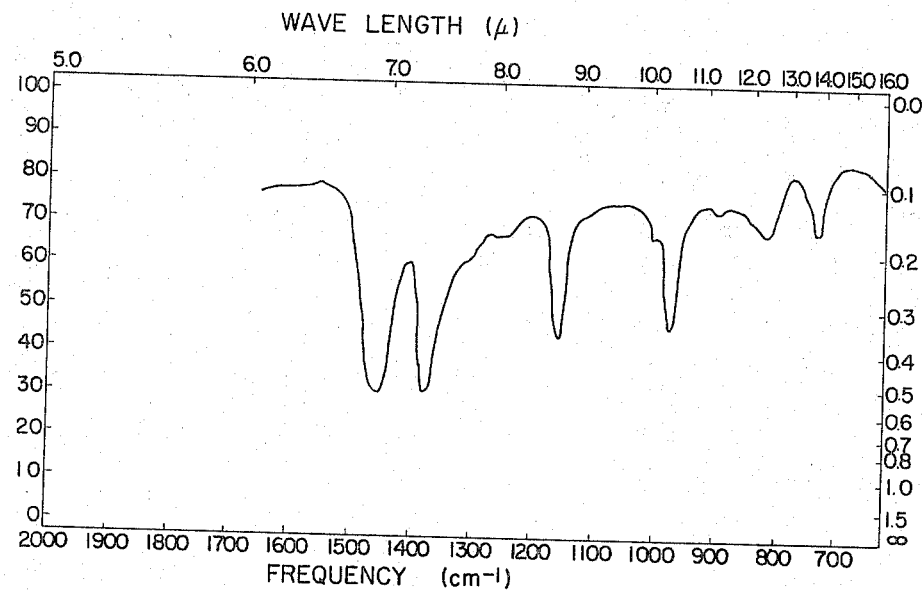

The specific gravity of this polymer was 0.859 and its infrared absorption spectrum was as shown in FIG. 3. According to Wei's method of measuring the propylene content in ethylene-propylene copolymer, the propylene content of this polymer was 58%.

Example 12

A 300-ml. 4-neck flask similarly equipped as in Example 6 was charged with 1 g. of [V]·[Fe] and 1 ml. of triethyl aluminum with 150 ml. of ethylene dichloride, after which propylene gas was introduced at the rate of 150 ml./min. at 50° C. A white, powdery polymer having a specific gravity of 0.9401 and an intrinsic viscosity $$[\eta]_{tetralin}^{135°C.}$$

of 1.46 was obtained in an amount of 1.66 g.

Figure 4:
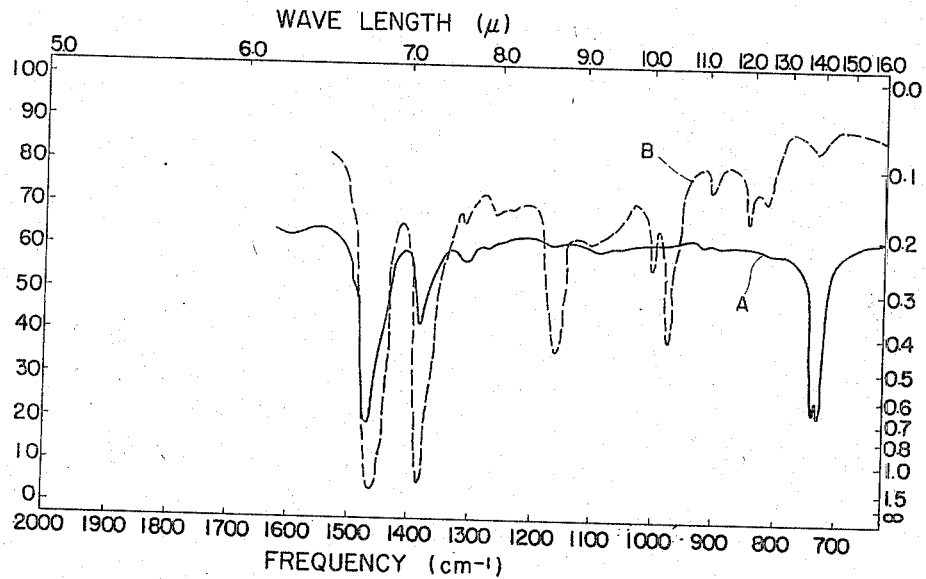

Curve A of FIG. 4, which is an infrared absorption spectrum of this polymer, coincides exactly with that of polyethylene.

Example 13

The same procedures as described in Example 12 were followed, except that monochlorobenzene was used as the solvent instead of ethylene dichloride.

0.12 g. of a white polymer having elasticity was formed. Tackiness as seen in the case of amorphous polypropylene was not observed in this polymer. The propylene content of this polymer obtained by Wei's method was 80%. Curve B of FIG. 4 is the infrared absorption spectrum of this polymer.

Examples 14–19

300 ml. of ethylene dichloride was introduced into a 500-ml. 4-neck flask similarly equipped as in Example 13 and, in the order given, iron acetyl acetonate in the amounts listed in the following table, 2 ml. of 2 N-ethylene dichloride solution of vanadium tetrachloride and 1 ml. of triethyl aluminum were added.

Propylene gas was then introduced in at the rate of 150–200 ml./min. under atmospheric pressure and at 50° C. Two hours later, methanol was added and the reaction was stopped. The precipitated solid was filtered off and dried in vacuum. The results were as shown in the following table.

| Example | Iron Acetyl Acetonate, g. | [Fe]/[V] Mole Ratio | Amount of Polymer obtained, g. |
|---|---|---|---|
| 14 | 0 | 0 | 0.6 |
| 15 | 0.35 | 0.25 | 1.3 |
| 16 | 1.06 | 0.75 | 0.46 |
| 17 | 1.41 | 1.0 | 0.31 |
| 18 | 2.12 | 1.5 | 0.2 |
| 19 | 2.82 | 2.0 | 0.15 |

Figure 5:
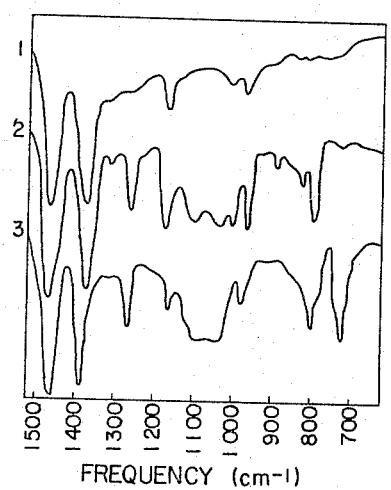

Curves 1, 2 and 3 of FIG. 5 are the infrared absorption spectra of the polymers obtained in Examples 14, 17 and 19 respectively. The polymer prepared without iron acetyl acetonate in Example 14, as evident from curve 1, is clearly polypropylene. The infrared absorption spectra of the polymers in Examples 15, 16 and 18 almost approximates the curves 2 or 3.

Examples 20–23

50 ml. of ethylene dichloride was introduced into a 100-ml. autoclave equipped with a magnetic stirrer to which were then added and mixed iron acetyl acetonate as in the following table, 4 millimoles of vanadium tetrachloride and 1 ml. of triethyl aluminum, in the order given.

After sealing the autoclave and exhausting the air therefrom, propylene gas was introduced at cylinder pressure and the reaction was carried out at 50° C. for 2 hours. The results are shown in the following table.

| Example | Iron Acetyl Acetonate, g. | [Fe]/[V] Mole Ratio | Amount of Polymer obtained, g. |
|---|---|---|---|
| 20 | 0 | 0 | 10.4 |
| 21 | 0.35 | 0.25 | 1.4 |
| 22 | 1.06 | 0.75 | 3.6 |
| 23 | 2.12 | 1.5 | 0.2 |

Figure 6:
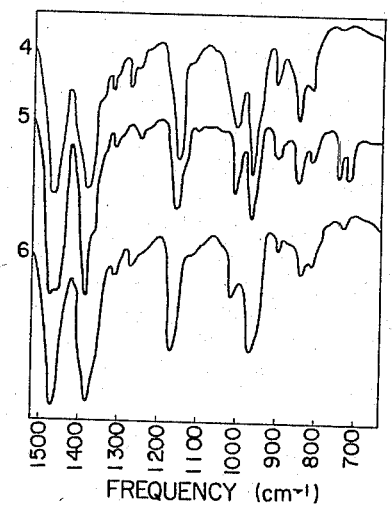

Curves 4, 5 and 6 of FIG. 6 are the infrared absorption spectra of the polymers in Examples 20, 21 and 22 respectively.

Examples 24–27

These examples illustrate the use of a mixed solvent. A 200-ml. stirrer-equipped autoclave was charged with 100 ml. of an ethylene dichloride-monochlorobenzene mixed solvent the proportions of which mixture were varied as set forth in the following table. To this were then added and mixed 0.35 g. (1 millimole) of iron acetyl acetonate, 4 millimoles of vanadium tetrachloride and 1 ml. of triethyl aluminum, in the order given.

Then, after sealing the autoclave and exhausting the air therefrom, propylene gas was introduced at cylinder pressure, and the reaction was carried out at 50° C. for 2 hours. The results were as tabulated below.

| Example | Ethylene Chloride/ Monochlorobenzene Mixture ratio (wt.) | Amount of Polymer Formed, g. |
|---|---|---|
| 24 | 9 | 2.6 |
| 25 | 4 | 3.9 |
| 26 | 1 | 1.4 |
| 27 | 2/3 | 3.0 |

Figure 7:
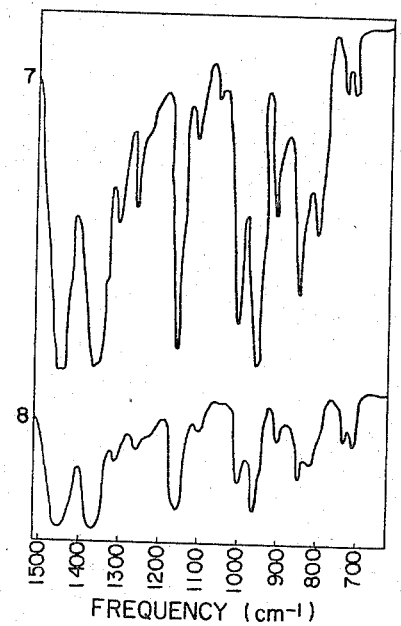

Curves 7 and 8 of FIG. 7 are the infrared absorption spectra of the polymers in Examples 24 and 25, respectively.

Examples 28–32

The 4-neck flask as in Example 12 was charged with 200 ml. of dried benzene, and then after replacing the atmosphere of the entire reaction system with nitrogen, it was replaced with propylene gas. At the same time, the solvent was also saturated with the propylene gas. Next, iron acetyl acetonate in the amounts set forth in the following table, 1 ml. of triethyl aluminum (7.34 millimoles) and 4 millimoles of vanadium tetrachloride were added and mixed, in the order given.

The reaction began simultaneously as the addition of the catalyst was completed. While continuing the stirring for 2 hours at 50° C., propylene gas was introduced at the rate of 400 ml./min. The results were as follows:

| Example | Iron Acetyl Acetonate G. | Iron Acetyl Acetonate Millimole | [Fe]/[V] Mole Ratio | Amount of Polypropylene obtained, g. |
|---|---|---|---|---|
| 28 | 0 | 0 | 0 | 10 |
| 29 | 0.35 | 1 | 1/4 | 21.7 |
| 30 | 0.175 | 0.5 | 1/8 | 26.2 |
| 31 | 0.044 | 0.125 | 1/32 | 22.4 |
| 32 | 0.022 | 0.0625 | 1/64 | 15 |

As can be seen from the above table, when the amount added of the iron acetyl acetonate is 0.175 g. i.e., 0.5 millimole, it is most effective. As previously stated, while desirable results are usually obtained when the mole ratio [Fe]:[V] is 0.01–2.0 and mole ratio [Al]:[V] is 1 or more, in this example the optimum result was obtained when the mole ratio [Fe]:[Al]:[V] was 0.5:7.34:4.

Example 33

The same flask as used in Examples 28–32 was used, to which was charged 200 ml. of dried benzene followed by adding, in the order given, iron acetyl acetonate, triethyl aluminum and vanadium tetrachloride in a mole ratio 0.5:7.34:4. The propylene was polymerised in the same manner as described in Examples 29–33 at varying temperatures of 0° C., 20° C., 50° C. and 80° C. One hour later, the yield of polypropylene was measured. As composition controls, similar treatments were carried out without the addition of iron acetyl acetonate and the respective yields were measured. These results are graphically presented in FIG. 8.

As is apparent in FIG. 8, the yield of polypropylene increases rectilinearly as the reaction temperature decreases. Further, it is seen that better yields are obtained in the case of the present invention.

The catalyst composition of this example is the same as in Example 30. And whereas, as seen in FIG. 8, about 10 g. of polypropylene is formed by carrying out the reaction for 1 hour at 50° C. but in Example 30, as described hereinbefore, as much as 26.2 g. of propylene has been obtained by carrying out the reaction for 2 hours at 50° C. On the other hand, the catalyst without iron acetylacetonate is the same as in Example 28. And, whereas, as seen in FIG. 8, about 8 g. of polypropylene is obtained by carrying out the reaction for 1 hour at 50° C., in Example 28 only 10 g. of propylene is formed by carrying out the reaction for 2 hours. From the foregoing it can be seen that the catalyst system in which iron acetyl acetonate has been incorporated maintains its activity at a constant level for long period of reaction time.

Example 34

This example illustrates the relationship between the effect of addition of iron acetylacetonate and the rate of propylene gas absorption.

To 200 ml. of ethylene dichloride saturated with propylene gas were added 1 millimole of iron acetyl acetonate. 7.34 millimoles of triethyl aluminum and 4 millimoles of vanadium tetrachloride in the order [Fe], [Al] and [V] and in the order [Al], [Fe] and [V]. The reaction vessel was connected with a propylene gas source maintained at atmospheric pressure. The amount of propylene gas absorbed into the system was measured from the time of completion of the additions of the catalyst compositions. Similar measurement was made in the system to which no iron acetyl acetonate was added. The results of these measurements are graphically illustrated in FIG. 9.

The catalyst system according to this invention has a high activity of propylene gas absorption.

What we claim is:

1. A process for preparing a polyolefin which comprises polymerising an alpha-olefin using as a catalyst a composition comprising an addition product of vanadium tetrachloride and iron acetyl acetonate, and an organometallic compound of a metal of Groups I–III of the periodic table, and effecting said polymerisation reaction in a solvent which dissolves said catalyst but is inert thereto, at a temperature between the freezing point and the boiling point of said solvent and a pressure between atmospheric and 100 kilograms per square centimeter.

2. A process according to claim 1 in which the olefin is propylene.

3. A process according to claim 1 in which the organometallic compound is trialkyl aluminum.

4. A hydrogen shift polymerisation process of propylene which comprises polymerising propylene using as a catalyst a composition product obtained by adding a trialkyl aluminum to a mixture of vanadium tetrachloride and iron acetyl acetonate, and effecting said polymerisation reaction in a solvent which dissolves said catalyst but is inert thereto, at a temperature between the freezing point and the melting point of said solvent and a pressure between atmospheric and 8 kilograms per square centimeter.

5. A catalyst composition comprising an addition product of vanadium tetrachloride and iron acetyl acetonate and an organometallic compound of a metal of Groups I–III of the periodic table.

6. A catalyst composition according to claim 5 in which the organometallic compound is trialkyl aluminum.

No references cited.

JOSEPH L. SCHOFER, *Primary Examiner.*

M. B. KURTZMAN, *Assistant Examiner.*